United States Patent [19]

Gill

[11] 4,089,357
[45] May 16, 1978

[54] THREADED FASTENER

[75] Inventor: Peter John Gill, Wolverhampton, England

[73] Assignee: G.K.N. Fasteners Limited, England

[21] Appl. No.: 706,035

[22] Filed: Jul. 16, 1976

[30] Foreign Application Priority Data

Jul. 19, 1975 United Kingdom ............ 30366/75

[51] Int. Cl.² ........................................... F16B 23/00
[52] U.S. Cl. ........................................ 145/50 A; 85/45
[58] Field of Search ............ 85/45; 145/50 A, 50 R; 10/7

[56] References Cited

U.S. PATENT DOCUMENTS

| | | | |
|---|---|---|---|
| 2,046,837 | 7/1936 | Phillips | 85/45 |
| 2,082,748 | 6/1937 | Brown | 85/45 |
| 2,445,978 | 7/1948 | Stellin | 85/45 |
| 3,108,623 | 10/1963 | Muenchinger | 85/45 |
| 3,293,978 | 12/1966 | Handley | 85/45 |

FOREIGN PATENT DOCUMENTS

| | | | |
|---|---|---|---|
| 692,272 | 8/1964 | Canada | 85/45 |
| 943,521 | 12/1963 | United Kingdom | 85/45 |
| 1,006,509 | 10/1965 | United Kingdom | 85/45 |

Primary Examiner—Marion Parsons, Jr.
Attorney, Agent, or Firm—Dowell & Dowell

[57] ABSTRACT

A screw having a head and a threaded shank and, in the head, a cruciform shaped recess comprising a central cavity and four grooves radiating from the central cavity at 90° angular spacings, the bases of the grooves lying on a conical (or pyramidal) surface and wherein the included angle at the vertex of such cone (or pyramid) has a value within the range of 40° – 45°, the preferred value being 40°.

5 Claims, 18 Drawing Figures

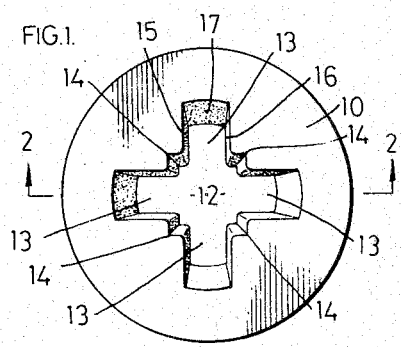
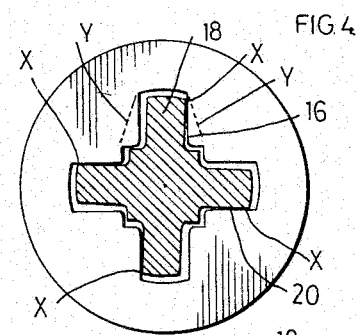
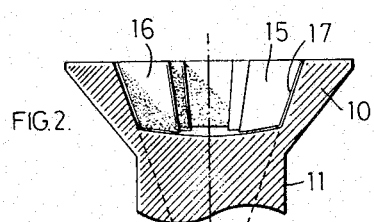
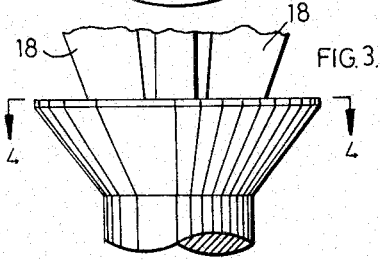
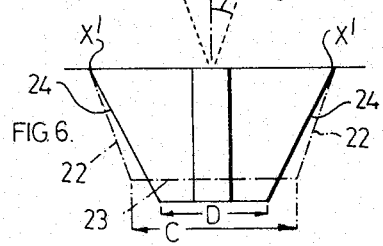
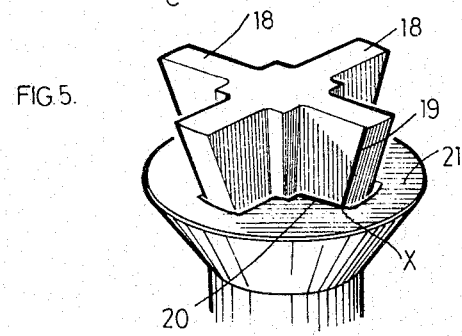
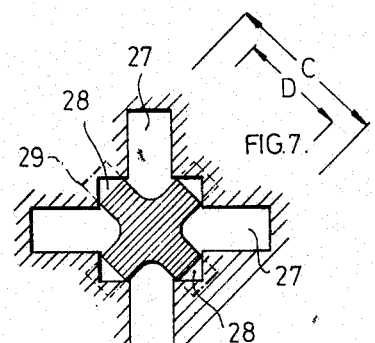
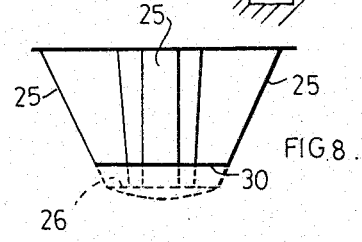

THREADED FASTENER

This invention relates to externally threaded fasteners (hereinafter referred to as screws) of the type in which the screw has a driver-engaging recess punched in one end, usually in a head at one end of the shank, the recess being of the "cruciform" type having a central cavity and four grooves radiating from the cavity and spaced at 90° angles therearound, each groove being adapted to receive a radially outwardly projecting wing on the driver for the screw. The outer or base wall of each groove is part of the surface of a truncated cone or pyramid which is co-axial with the axis of the screw and has its larger diameter at the outer, or open, end of the recess.

When used hereinafter, the expression "a screw of the type specified" means a screw having the above mentioned features.

In practice, when driving such a screw, the value of the maximum driving torque which can be applied is governed by:

(a) the possibility of torsional fracture of the shank;
(b) possibility of reaming out the recess;
(c) tendency for the driver to "cam-out" of the recess, that is self-disengagement of the driver from the recess due to reaction forces.

So far as (a) and (b) are concerned these are problems which can be overcome simply by increase in the strength of the material of the screw where necessary but (c) is a problem which has always been a major cause of trouble in driving of such screws and is one which can only be eliminated, or substantially reduced, by change in the design of the recess based upon a correct understanding of the mechanics of the process of camout. We have discovered from our researches that past attempts and proposals to deal with the problem have not been successful because they have been based upon a false premise, i.e. a misunderstanding of what actually happens, and what leads to camout of the driver, during the actual driving of a screw.

Hitherto, in attempts to improve the performance of screws of the type specified, it has been assumed that the contact between the driving face of a driver wing and the associated driving wall of the recess groove has been a face-to-face contact extending over a definite area of engagement between driver wing face and groove wall. Thus, proposals to improve performance by changes in the design (i.e. the geometry) of the recess have started from this premise which we have discovered to be a false premise.

In the theoretically perfect case, which may be reached or approached with a perfectly formed recess and exactly matching driver (when new), there is the possibility of face-to-face engagement, but as explained later, in the majority of cases in practice this situation does not prevail.

As is demonstrated in more detail later on herein the true position, in practice, it is that there is only "point" contact between an edge of the driver wing and an edge of the groove wall and it can be shown that resistance to driver cam-out depends upon achieving maximum frictional resistance between these two edges. Any change in the geometry of the recess, which starts from this premise, brings into consideration a parameter which, so far as we are aware, has hitherto not been considered by others seeking to improve the cam-out resistance of screws of the type specified. This is a parameter in the geometry of the recess which is known, in practice, as the "main cone angle" and this is the included angle of the vertex of the conical or pyramidal surface which defines the bases of the radially extending, diametrically opposed, grooves.

We have discovered that the value of the main cone angle plays a very significant part in the performance of a screw in relation to resistance to cam-out. However, when considering variation in the value of the main cone angle there are other important factors to be taken into account.

There are two important commercial factors to be considered. One of these has to do with the number of different sizes of driver required to cover the whole range of screw sizes. For many years past, the most commonly used screw of the type specified is that which is known world-wide under the Registered Trade Mark "Pozidriv." For such known screws there are five basic recess sizes (designated 0, 1, 2, 3, 4) and five basic drivers some for each recess size. The main cone angle is the same for each size of recess but the the proportions differ. The radial extent of the grooves and width of each groove are greatest in the longest recess size and gradually get smaller as the recess sizes get smaller. The same applies to the driver as regards radial extent and width of wings. One size of recess can be forged in several different sizes and types of screws and the depth of penetration of the recess will vary according to the size and type of screw head (i.e. it will be less in the smaller size than in the larger size). Over the whole range there are just over 100 different sizes and types of screw head and it is clear that it would be quite impractical to attempt to provide an equivalent number of different sizes of driver so as to have an exactly matching driver for each size of recess in each size of screw. Because the main cone angle is the same for every size of recess it was realised that one size of driver could be used to drive several different sizes and types of screw all having the same size recess provided that with the recess having the smallest depth of penetration the depth of engagement of the nose of the driver is sufficient to ensure stability of the driver during driving. It was found by experience the whole range of screw types and sizes most commonly used in practice could be covered by five sizes of driver corresponding to the five sizes of recess.

We have discovered that there is a practical lower limit on the extent to which the main cone angle of the recess can be reduced, below which limit one size of driver will not be capable of use with the same number of different screw sizes as is the case at present with the known recess above referred to. Thus, reduction in the size of the main cone angle must be governed by the need to preserve this feature of multiplicity of screw sizes for each size of driver so as not to bring about a commercially unacceptable increase in the number of drivers required to cover the whole range of screw sizes.

The other factor which is of quite significant commercial and economic importance is that, if there is any change in the form of the recess then it should be such that there can be a satisfactory degree of compatibility between the new form of recess and the drivers which have been used for operating on the said known form of recess. It will be appreciated that this is most desirable, if not essential, in order to avoid the expense of having to provide a complete new set of drivers when there is any change in the shape of recess. Thus, any new form of recess should be compatible with the old form of drivers or at least there should be required only a minimum inexpensive modification to make old drivers compatible with any new form of recess.

The object of the invention is to provide improvement in the recess of a screw of the type specified which will provide an increase in the performance characteristics of the screw as regards the abovementioned problem of cam-out of the driver and will also satisfy the two abovementioned commercial factors.

According to the invention, in a screw of the type specified the main cone angle of the recess (as herein defined) has a value lying within the range 40° to 45°.

The abovementioned known recess (R.T.M. Pozidriv) has a main cone angle of 52°. With the present invention providing such a substantial reduction in the value of the main cone angle, it would not be expected that it would be possible to maintain (let alone increase) the cam-out performance characteristic of the recess and still satisfy the second of the two abovementioned commercial factors (i.e. compatibility with the existing form of driver). We have discovered that, contrary to such expectation, the cam-out performance of the improved recess when used with the existing known driver, is better than that of the said known recess (Pozidriv) when used with such known driver (i.e. the known compatible Pozidriv recess/driver combination).

The majority of screws of the type specified have a head of enlarged diameter relative to the threaded shank of the screw and there must be left a sufficient amount of metal between the outer boundaries of the recess and the outer surfaces of the head to maintain the required strength in the head so that it can withstand the torque applied during driving and so that there is no danger of head cracking during the head forming process. Also there is a limit on the maximum axial depth of the recess because the inner or bottom portion of the recess may enter the upper end portion of the shank adjacent the head and must not be so near the junction between the head and the shank of the screw as to give rise to the possibility of weakening this junction such as might lead to fracture between the head and the shank under the driving torque applied.

Because the improved recess of this invention has a smaller main cone angle than the said known recess, there has to be some corresponding reduction in the axial depth of the recess so as to avoid weakening the screw head, particularly at the junction between head and shank. However, this reduction in axial depth of the recess can be used to advantage to overcome another problem which has been encountered by users of screws, having the said known recess. In said known recess there are V-shaped valleys in the walls of the central cavity of the recess at positions intermediate circumferentially adjacent grooves and the walls of these valleys lie in planes which slope inwardly towards the central axis of the recess.

This problem is the tendency for the driver to make incorrect engagement with the recess. When this happens, instead of the driver wings engaging correctly in the grooves of the recess the leading ends of the wings engage in the V-shaped valleys in between the grooves and proper driving of the screw is impossible. In mass production techniques using a power operated driver to drive a large number of screws one after the other the driver may be rotating when offered to the recess and this practice greatly increases the chance of the aforesaid misengagement taking place. There is the possibility of damage to the driver or to the recess or both and loss of valuable production time.

However, because of the reduction in axial depth of the recess it is preferably [though not essential as explained later] to have a corresponding reduction in the axial length of the "nose" of the driver (i.e. the already know driver). This involves only a simple grinding operation to remove a portion from the extremity of the nose, taken in a plane normal to the axis of the driver and it has the effect of increasing the diametrically measured distance between opposed wings of the driver at this extremity of the nose. Thus the position can be achieved where this distance is greater than the distance between the widest parts of two opposed V-shaped valleys when these are present in the improved recess, or, in terms of the geometry of the improved recess having V-shaped valleys the distance measured normally between the innermost ends of the bases of diametrically opposed grooves is greater than the distance measured normally between the wide parts of two diametrically opposed V-shaped valleys. Thus the driver wings cannot now make engagement in the V-shaped valleys and this problem of incorrect driver engagement is eliminated.

Additionally, the recess of this invention leads to further improvement related to the manufacture of the screws with reference to the problem known in the art as "metal fallaway" and this aspect of the invention is discussed in more detail in the following which is a more detailed description, given by way of example, of one embodiment of the invention and illustrated in the accompanying drawings wherein:

FIG. 1 is a plan view of the head of a screw having a recess according to the invention, FIG. 2 is a section on the line 2—2 of FIG. 1

FIG. 3 is a view in side elevation showing the nose of a driver engaged in the recess, FIG. 4 is a section on the line 4—4 of FIG. 3, FIG. 5 is a broken perspective view showing the nose of a driver engaged in the recess, FIGS. 6 and 7 are diagrams to illustrate an advantage of the improved recess FIG. 8 is a side elevation of the nose of a driver.

Figure 12:
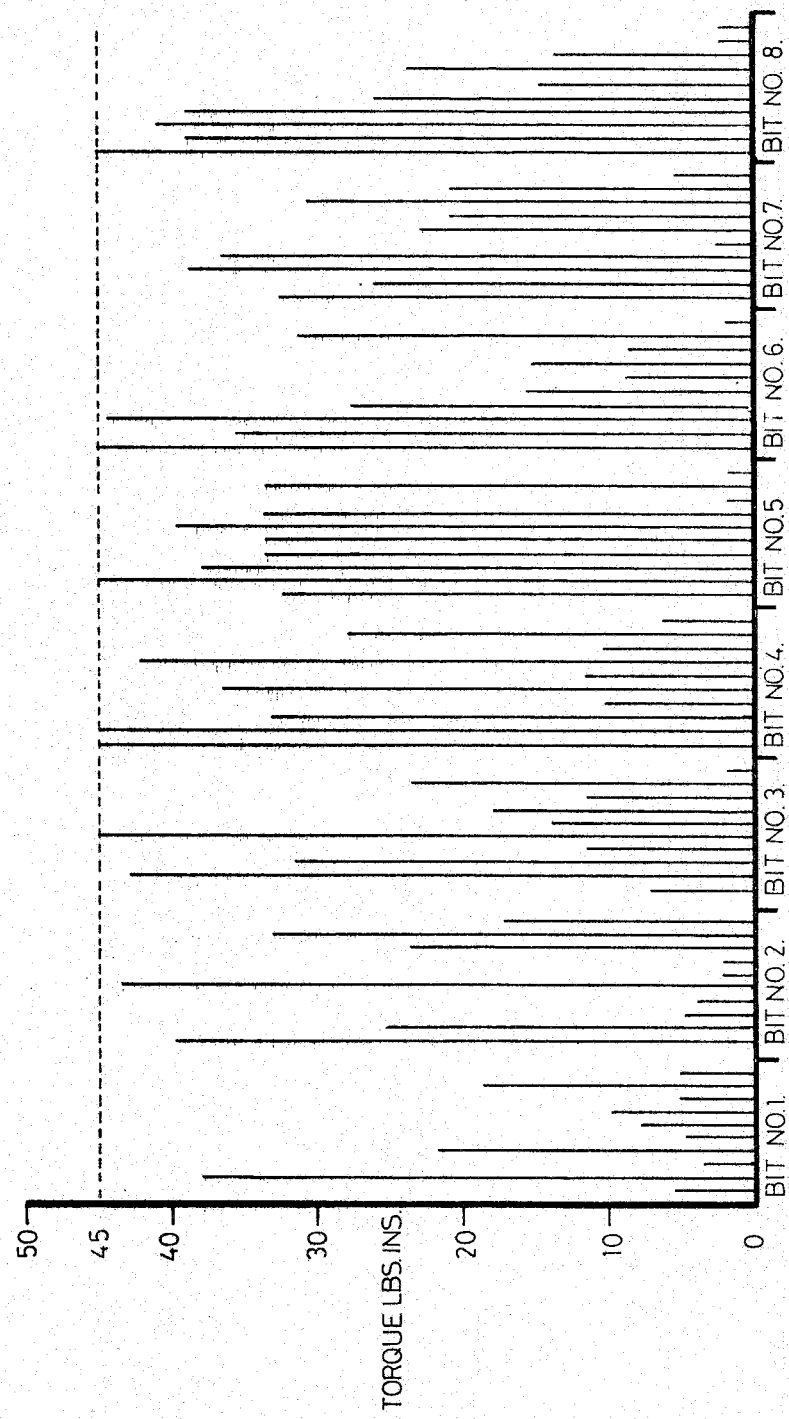
Figure 13:
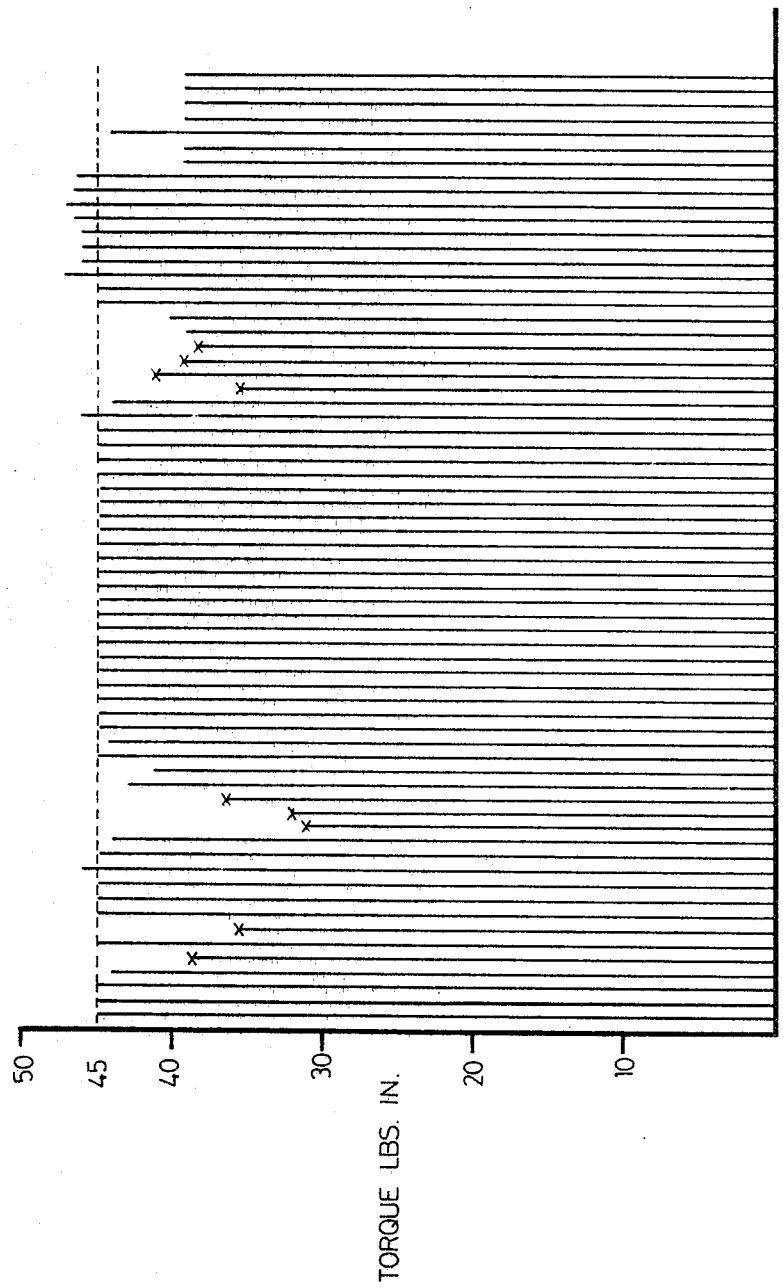
Figure 14:
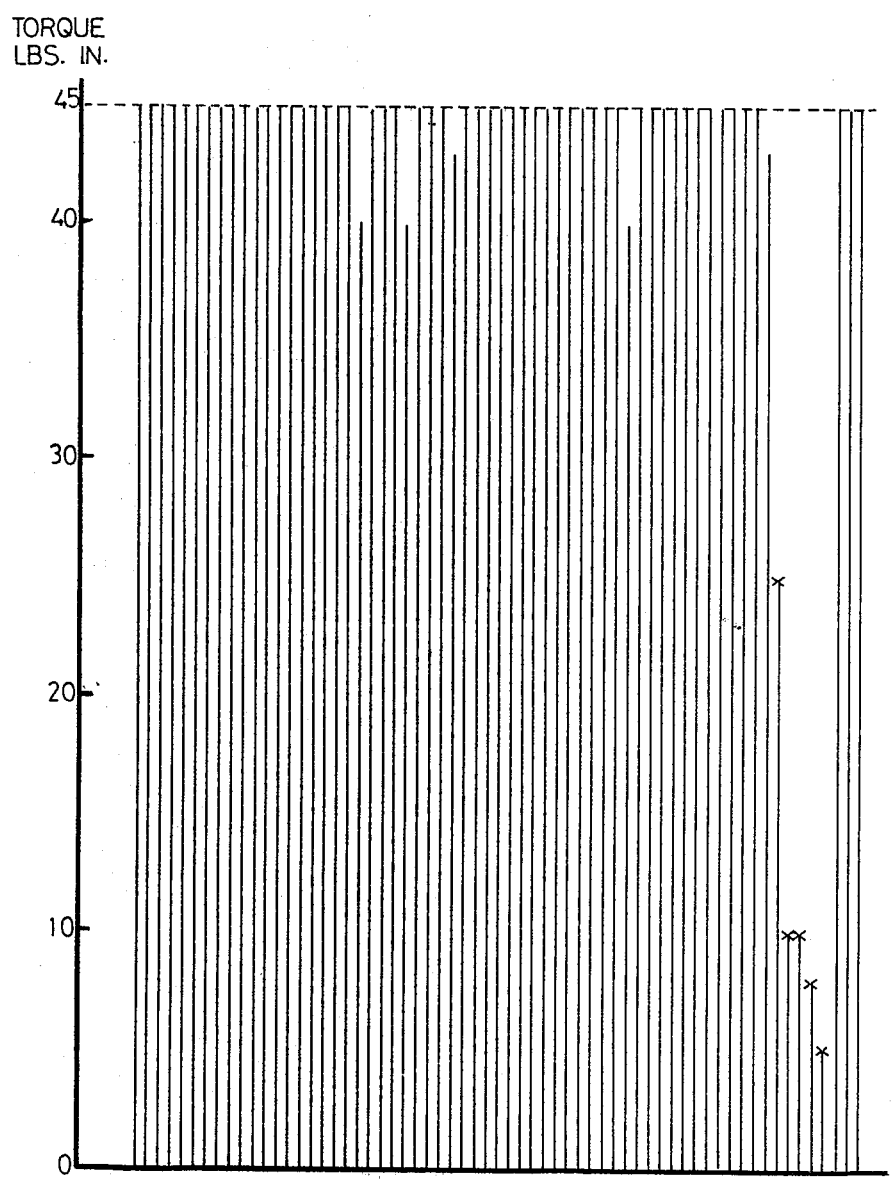

FIGS. 12, 13, and 14 are graphs of tests performed on screws having said known recess and screws having the improved recess.

Figure 15:
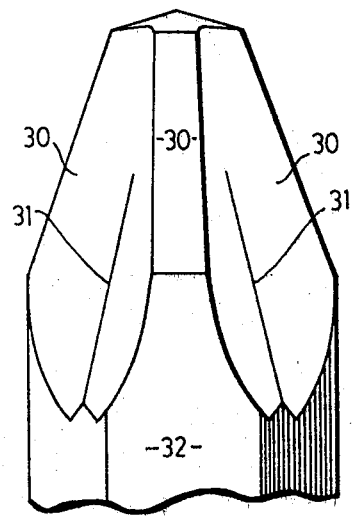
Figure 16:
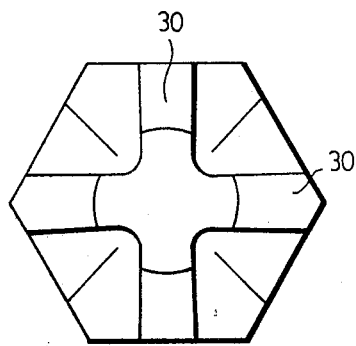

FIG. 15 and FIG. 16 are side and end elevations respectively of a driver for use with the recess of FIGS. 1 and 2.

Figure 17:
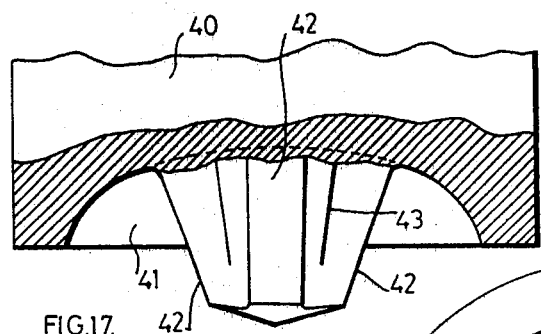
Figure 18:
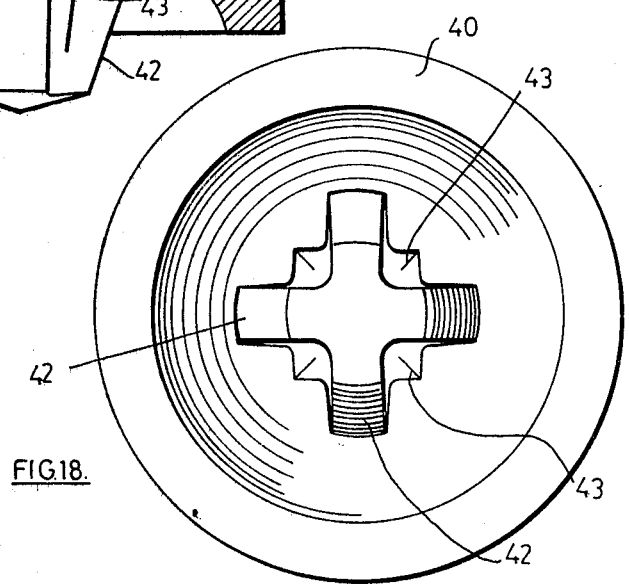

FIG. 17 is a fragmentary side view and FIG. 18 is a corresponding end view of a punch for forming a recess according to FIGS. 1 and 2 in the head of a screw.

Referring to FIGS. 1 and 2 the recess of the invention is shown applied to a screw having a countersunk head 10 and shank 11, the recess comprising a central cavity 12 from which the four grooves 13 radiate in a cruciform fashion. In this embodiment of the invention, in between adjacent grooves are the aforesaid V-shaped valleys 14. Each groove has opposed side walls 15, 16 and a base 17, and assuming a normal right hand thread for the screw, each side wall 16 is known as the driving wall of the groove, being the wall which is engaged by the co-operating wing of a driver during the operation of driving the screw.

The bases 17 of the grooves each have slight curvature and lie on a conical surface (see dotted lines in FIG. 2) the vertex angle of this conical surface being the main cone angle hereinbefore referred to. In the preferred embodiment of recess the angle $2\theta$ has a value of 40°.

The side walls 15, 16 may be considered as lying in parallel planes although in practice, and as shown exaggerated in FIGS. 1 and 2, these side walls will incline inwardly and downwardly of the recess by a very slight amount, this being the normal angle of "draft" provided on the punch which forms the recess in the head of the screw.

Referring now to FIGS. 3, 4 and 5, the nose of a driver having wings 18 is shown engaged in the recess, FIGS. 4 and 5 having been drawn to show the conditions of engagement between driver and recess when torque is being applied to the driver. Because of normal engineering tolerances the wings of the driver are not a 100% perfect fit in the grooves of the recess and certain clearances exist between the faces of the wings and corresponding surfaces of the grooves. These clearances have been shown exaggerated in FIGS. 4 and 5 in order to make them discernible.

In the theoretical consideration, when torque is applied to drive the screw, the engagement between a driver wing 18 and a driving wall 16 of a groove, is a face to face engagement, but due to the aforesaid clearances this is not so in practice and the engagement is, as shown, virtually point engagement (see X in FIGS. 4 and 5) between edge 19 of a driver wing and the edge 20 of the groove (FIG. 5). Edge 19 is the edge between the side face and end face of the driver wing and edge 20 is the edge between the wall 16 of the groove and upper surface 21 of the head 10.

Proposals to increase the cam-out resistance of this type of recess have, in the past, been based upon a consideration of one flat surface sliding in contact over another which, as we have now shown, is not the true case in practice and we believe that this could be the reason why such previous proposals have not met with any significant success. However, once it is appreciated that cam-out resistance depends upon the friction between said two edges engaging with what is virtually point contact, then the matter becomes a consideration of the three-dimensional geometrical relationship between the directions of movement of said two edges. When cam-out starts to take place the point of contact X moves inwardly along the edge 20 as the edge 19 rises out of the recess and this situation can be equated to movement up an inclined plane (having a very steep angle of inclination) with the resistance to cam-out being equivalent to the horizontal force required to push a load up the inclined plane. It can be shown that, as the angle of inclination increases, there is reached a critical value at, and above which, no movement will take place irrespective of the amount of force applied. (The value of such critical angle will be dependent upon the co-efficient of friction at the point of contact between the two edges).

For a given co-efficient of friction we have found that there is a critical value or "critical angle" at or above which value no cam-out will take place irrespective of the end load being applied axially to the driver. One has also to take into account the previously mentioned factor of metal fall-away which is well understood in the art and needs only brief explanation. When the punch is forming the recess in the screw head the metal tends to be wedged outwardly and the side walls of the grooves do not conform perfectly to the configuration of the punch. This is especially prevelant with "pan" heads and like heads which are not confined in a die during forming of the recess and are therefore free to spread radially.

Fall-away means that the side walls in a groove do not lie in parallel planes (as shown in the drawings) but diverge from one another and as fall-away has most effect in the region of the central cavity 12 this means that the edge 20 of the side wall may have a line of direction extending generally at a small angle to the true plane which it should occupy (in the absence of fall-away). Such line is indicated by dotted line Y in FIG. 4 and the aforesaid angle is known as the "fall-away angle."

The effect of metal fall-away can be reduced if the main cone angle of the recess is reduced, which means a reduction in the fall-away angle. We have found that reduction in the value of this fall-away angle is seen to contribute very significantly to increase in cam-out resistance and thus, from the view-point of recess design it follows that the smaller the main cone angle the better the resistance to cam-out.

However because of the necessity to retain the aforementioned commercial factor of one size of driver being usable with a plurality of different sizes of screw there is a practical limit to the extent to which the main cone angle can be reduced and we have therefore had to determine what is the value of this lower limit for the main cone angle.

Figure 9:
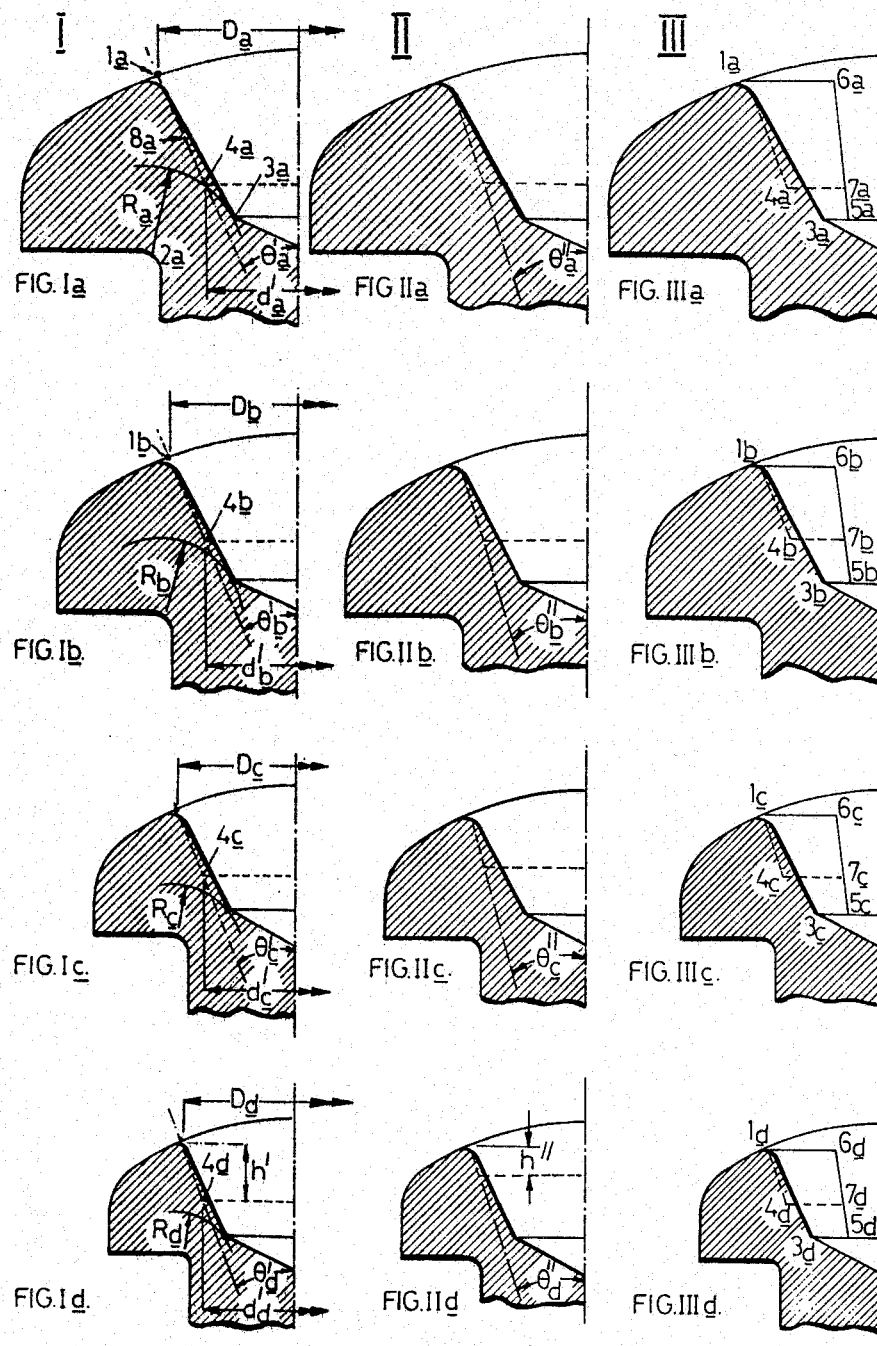
FIGS. 9, 10 and 11 are diagrams and graphs relating to the aspect of driving different sizes of screw with one size of driver.
Figure 10:
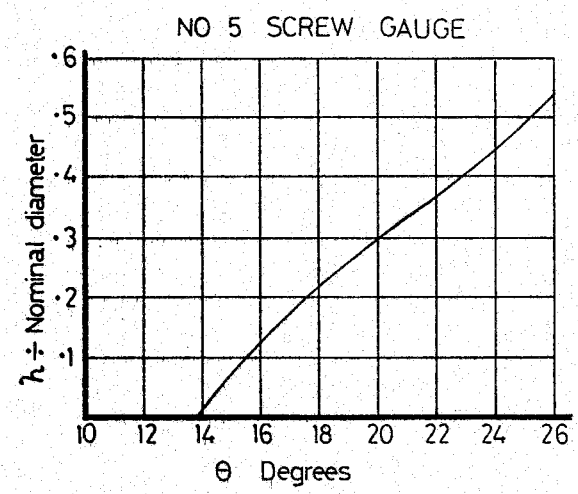
Figure 11:
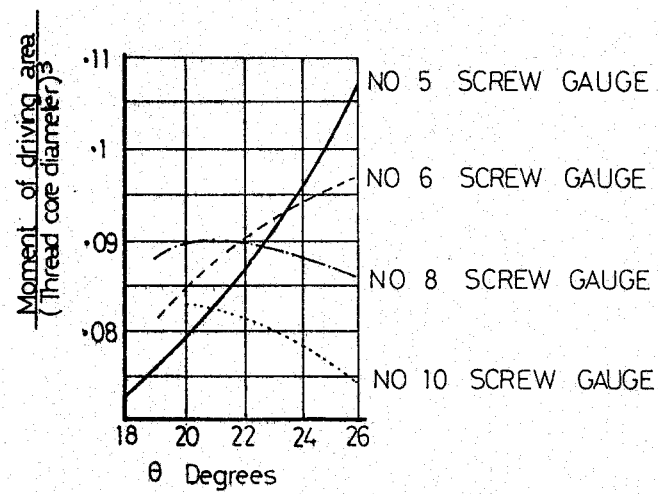

For this purpose, reference is now made to FIGS. 9, 10 and 11.

The unbroken lines in columns I, II and III of FIG. 9 represent the outlines of Pan heads with current "Pozidriv" recesses (i.e. the known recess referred to). With regard to these outlines columns I, II and III are identical and rows $a$, $b$, $c$ and $d$ represent screw gauges 10, 8, 6 and 5 respectively to a scale of approximately times 10. These four sizes have been chosen because they are in very common use and more important because they are driven with the same size of "Pozidriv" (i.e. a Number 2 driver). The outline of the improved recess according to the invention is shown in broken lines.

Also when considering ways to improve a currently used recess there are two other design criteria which need to be met. First the enveloping diameter over the grooves at the top of the head must not be increased because this will introduce the probability of head cracking during the cold forming operation of the recess. These diameters are shown with the symbols D$a$, D$b$, D$c$, D$d$ in column I($a$) to ($d$) respectively.

Secondly with reference to column I($a$) as an example, the distance between the underhead shank fillet zone 2($a$) and the bottom corner of the recess 3($a$) in the conventional "Pozidriv" must not be reduced (see 4($a$) in the improved recess) otherwise the strength of the shank to head junction will be reduced.

The design of an improved recess with reduced main cone angle must therefore be considered as follows.

Referring to column I($a$), through point 1$a$, which is positioned at the current overall diameter of the wings at the top of the head, a line 8$a$ is drawn at an angle $\theta_a'$ to the main central axis of the screw. $\theta_a'$ is called the semi cone angle (i.e. one half the main cone angle). An arc of radius R$a$ (struck from the centre of the underhead fillet radius) is drawn through point 3$a$ which is the bottom corner of the current "Pozidriv" recess. The intersection point of this arc and line 8$a$ defines the bottom corner of the new recess and satisfies the condition that the distance to the underhead fillet zone 2a is the same as before. Point 4a also defines the diameter at the bottom of the new recess (shown with the symbol $d_a'$) and this diameter must be maintained in the head sizes for screw gauges 8, 6 and 5 (shown in rows b, c and d respectively) in order to enable a single size of driver to be used.

Turning now to the construction of the new recess for the size 8 screw gauge. Through point 1b which is positioned at the existing diameter $D_b$ for the present "Pozidriv" recess, a line is drawn at the angle $\theta_b'$ to the main screw axis. Point 4b is positioned on this line at the diameter $d_b'$ and this again represents the bottom of the new recess. The construction for the recesses for numbers 6 and 5 screw gauges follow in exactly the same way. In column I(a) to (d) the broken lines represent the new recesses and it should be noted that $\theta_a' = \theta_b' = \theta_c' = \theta_d'$ and $d_a' = d_b' = d_c' = d_d'$.

It will also be seen that the previously stated head/shank strength requirements are met because points 4b, 4c and 4d fall outside the respective arcs of radius Rb, Rc and Rd.

The entire procedure has been repeated in column II(a) to (d) with a smaller value for the angle $\theta$ i.e. $\theta_a''$ etc. is smaller than $\theta_a'$ etc.

We now compare columns I(d) and II(d) with respect to the resulting depths of the new recesses in screws of number 5 screw gauge. These are shown with the symbols $h'$ and $h''$ and it is immediately evident that with the smaller cone angle the depth of recess is reduced, i.e. $h''$ is smaller than $h'$. A graph can be drawn showing how the depth of the recess in a Number 5 screw gauge screw varies according to the chosen angle $\theta$. Such a graph is reproduced in FIG. 10 and this shows immediately that with an angle approximately equal to 14° (i.e. main cone angle of 28°) the depth of the recess in a Number 5 screw gauge head would reach zero.

Therefore this provides a theoretical absolute limit. Thus the reduction in the main cone angle must be arrested well before the value of 28° in order to ensure that a recess will exist at all in the Number 5 screw gauge head.

In further considering this aspect we next refer to column III and take the driving engagement between driver wing and groove wall.

The following is based upon consideration of the theoretical case of there being face-to-face contact between driven wing and groove wall but this is quite compatible with the practical case of edge-to-edge contact because once the condition has been established where cam out will not occur (irrespective of the applied torque) then further increase in torque will lead to the area of engagement between driver wing and groove wall correspondingly increasing from a blank area of edge-to-edge engagement towards the full area of face-to-face engagement.

Referring to column III(a), the trapexium 1a6a5a3a approximates to the driving area per groove of the current "Pozidriv" recess. The moment of this area about the main screw axis gives an indication of the torque which the recess can transmit. In order to compare these moments of area on screws of different sizes it is necessary to express them as a ratio of the polar moment of the core diameter of the shank or, for convenience, of the cube of the core diameter. These moment ratios are indicated for current "Pozidriv" in FIG. 11 (on the ordinate of 26°) for all the four screw sizes under consideration. It will be noted that the ratio is smallest for the Number 10 screw gauge and it is approximately 0.074. We consider that if this ratio of 0.074 is satisfactory for a current Number 10 screw gauge "Pozidriv" screw then it should be satisfactory for the improved recess in a Number 5 screw gauge screw. Referring again to column III(a) the trapezium 1a6a7a4a approximates to the driving area of the new recess according to the form shown in column I(a). Similar trapeziums are shown in columns III(b), III(c) and III(d) and with these the ratios of moments of area relative to polar moment of core diameter can be computed. Thus for each screw gauge a graph can be plotted showing the dependence of this moment ratio on the semi cone angle $\theta$. Such a set of graphs is shown in FIG. 11 and from it we can seen that with $\theta$ equal to 19° the moment ratio for the Number 5 screw gauge is already in the region of that for the current Number 10 "Pozidriv" screw gauge. The value of 20° therefore is a little on the safe side and is thus chosen as the preferred value (i.e. main cone angle 40°) for the improved recess and is also the lower limit of the range of possible values for the main cone angle of the improved recess.

We have found from experience that the improved cam-out performance of the recess can still be obtained with a main cone angle which is a few degrees in excess of 40° and our experience to date leads us to believe that a value of 45° is the practical upper limit for the value of the main cone angle at which value the cam-out performance, for the worst conditions, is still appreciably better than with the said known recess. By the "worst conditions" we mean the case of a screw head with maximum angle of fall-away and minimum co-efficient of friction between the material of the screw and that of the driver. The co-efficient of friction will vary according to the material of the screw and whether it has any surface finish, such as cadmium plating. In practice, we find that the lowest co-efficient of friction is about 0.1, which would be a cadmium plated screw and for other material it is about 0.15 to 0.2.

As mentioned previously, we have found that, contrary to what one would expect, the cam-out performance of the improved recess, when used with the said known driver is better than that of the said known recess. It had always been thought by those working in this field that the driver must match the recess and have a main cone angle the same as that of the recess. We have found that this is not so and, although there may be other additional reasons (of which we are not aware) for the abovementioned improved performance, we believe that the main reason is thus:

FIG. 6 is a diagram in which the outline of the said known recess (solid lines) is superimposed on the outline of the improved recess (chain dotted lines). The angle between the lines 22 is the main cone angle and line 23 is the base plane of the improved recess. FIG. 8 is a diagram of the nose of the said known driver, the portion shown in chain dotted lines being that portion which is ground away when this driver is to be used with the improved recess. If one now imagines this driver inserted into the improved recess then (referring to FIG. 6) the driver noze is shown in outline by the solid lines 24 and chain dotted line 23. Because the main cone angle of the improved recess is less than that of the driver the edge faces 25 of the driver wings enter more deeply into the grooves of the recess than would the edge faces of a driver which had the same main cone angle as the recess (taking into account the normal engineering clearances previously referred to). Hence when torque is applied to the driver the point of engagement between driver wing face and groove wall (X in FIG. 4) is now at, or closer to, the outermost extremity of the edge of the groove wall (see X' in FIG. 6). Thus the said point of contact is at, or nearer to, the position where the effect of metal fall-away is zero or at a minimum and thus the angle of fall-away is zero or at a minimum. Hence the conditions for resistance to cam-out are more favourable than the corresponding case of the said known recess and driver combination.

Furthermore, because the position of engagement between driver wing and groove wall (X') is further from the screw axis the moment arm of applied torque with the improved recess and known driver is greater than in the corresponding combination of said known recess and driver.

A further advantage arising out of the improved recess can be seen with reference to FIG. 7 and further reference to FIG. 6.

As mentioned, the solid lines in FIG. 6 represent the outline of the said known recess and the chain dotted lines represent the outline of the improved recess. At the mouth, the diameter measured between the outer ends of opposed grooves, has been kept the same in the improved recess as in the known recess, to obviate the danger of weakening the head which might give rise to cracking during the formation of the recess.

In FIG. 7 the cross-hatched portion is a section through the known driver which is shaped to conform to said known recess (i.e. a section on the dotted line 26 in FIG. 8) with the noze of the driver having been incorrectly offered to the recess so that the driver wings 25 instead of being engaged in the grooves 27 have become engaged in the widest part of each of the V-shaped valleys 28. However, in the improved recess, see FIG. 5, because the main cone angle has been decreased, the overall axial depth of the recess has been reduced and the distance C measured between the bases of diametrically opposite grooves at the inner end of the recess is increased by comparison with the corresponding distance D in the said known recess. From this it will follow that a driver adapted to conform exactly to the improved recess (i.e. same main cone angle), will have driver wings which are axially shorter than the wings of said known driver and also the distance between the extreme edges of opposed driver wings at the end of the driver will correspond to the distance C being greater than the distance D between the extreme tips of the diametrically opposed driver wings in said known driver.

Referring to FIG. 7 it will be observed that the increase in the distance between the extreme tips of diametrically opposed driver wings in such form of driver conforming exactly to the improved recess (as shown in chain-dotted lines 29) means that such distance C is now greater than the distance D between the widest part of one V-shaped valley and the widest part of the diagonally opposite valley. This means that if the driver is incorrectly offered to the recess in the manner shown in FIG. 7 the driver wings cannot now make any engagement in the V-shaped valleys and thus incorrect engagement of the driver with the recess is positively eliminated.

Even when taking the shortened form of the known driver having its ground-off end on line 30 (FIG. 8) it will be seen that the same conditions apply and incorrect driver engagement cannot take place with the improved recess.

There is a still further advantage gained in using the known driver (shortened as mentioned) with the improved recess and this is in applications where a screw has to be driven in a confined space and it is not possible to get the axis of the driver properly aligned with the axis of the screw. For example when driving a screw into a workpiece adjacent a corner, it may be necessary to tilt the driver in relation to the axis of the screw through an angle of up to 6° or 7° because the obstruction provided by the corner does not permit the driver to be accurately aligned with the screw axis. When using a driver which exactly conforms to the shape of the recess in the screw it is very difficult to satisfactorily drive the screw fully home and what frequently happens is that as the screw approaches the final position the increased resistance causes cam-out of the driver with the result that in the majority of cases the screw cannot be driven fully home and any excessive force used in an attempt to drive the screw fully home usually results in reaming out of the recess or fracture of the screw shank.

However, using the known driver with the improved recess, because the main cone angle of the driver is greater than that of the recess, there will be an angular clearance of the order of 6° between the bases of the grooves of the recess and the corresponding faces of the driver wings when the driver is applied axially into the recess with the result that the driver can be tilted through such angle away from the axis of the screw and the wings of the driver will still maintain satisfactory driving engagement with the grooves of the recess. It will be understood that, because the side walls of the grooves of the improved recess are not truly parallel but have a certain amount of "draft" as previously mentioned then when the driver is tilted in relation to the recess and in the direction of two opposed wings the remaining two opposed wings, which are at right angles to the first said two wings, will also be able to tilt because of this slight taper or draft provided on the walls of the grooves. Tests have proved that with this capability of being able to tilt the known driver in engagement with the improved form of recess it is possible to satisfactorily drive screws fully home in such confined spaces where true axial alignment of driver and screw is not possible.

We have carried out tests on a number of screws to demonstrate that the recess according to the invention, with a main cone angle of 40°, does give consistently better resistance to cam-out than does the said known recess. The apparatus used for such tests comprises a die into which the screw under test is screwed with a small end load of 2 lb. The die incorporates strain gauges which measure the applied torque at the instant that cam-out occurs. The results of some of these tests are shown in FIGS. 12, 13, 14.

In order to test the screws under the sort of conditions likely to be encountered in actual practise (e.g. on the shop floor) the screwdriver bit in the test rig was given an angle of 5° misalignment with the axis of the screw being driven and the screw chosen was a No. 6 gauge pan head screw which is a popular size and because of its pan head is likely to have some of the effects of metal fall-away in its recess. FIG. 12 shows the results obtained with tests on No. 6 screws having the said known recess and using the known driver bits. The first thing observed is that it was found not possible to drive more than ten screws with one bit before the bit became so worn that it had to be changed, so that for the eighty screws tested eight separate bits were required.

From past experience a figure of 45 lbs. ins has been adopted as being the maximum safe torque which can be applied to the No. 6 screw as torque in excess of this figure brings in the danger of fracture of the screw shank below the head. Hence, in the tests of FIG. 12 the applied torque was stopped at the value of 45 lbs. ins. if cam-out had not previously occurred at a lower torque.

From FIG. 12 it can be seen that of the eighty screws tested only six reached the safe maximum torque without cam-out occurring. For the remainder cam-out occurred at widely varying torques below this figure, some being as low as 2 lbs. ins., and the results showed great inconsistency in performance between one screw and another.

Turning now to FIG. 13, this shows results obtained with tests on No. 6 pan head screws having the improved recess and using the known driver which had been shortened by grinding away a portion of the nose as hereinbefore described, and the first thing to be noted is that it was possible to test over sixty screws with the same driver bit because, for the majority of the screws the test was stopped when the safe maximum torque of 45 lbs. ins. had been reached without cam-out taking place, hence the driver suffered no damage from the effect of cam-out. In a few cases the torque was taken above 45 lbs. ins., without cam-out taking place.

Some of the screws tested were cadmium plated and these are seen in FIG. 13 marked X as the cases where the test ended before the figure of 45 lbs ins. torque was reached, but due to failure of the screw head and not because of cam out. The explanation for this is that the cadmium plating reduces the frictional resistance between the thread of the screw and the material into which it being received and also reduces the frictional resistance below the head of the screw with the result that greater tension can be generated in the shank of the cadmium plated screw than in a similar non plated screw by the same torque. As no cam-out takes place, this increase in tension stress can be sufficient to cause fracture of the shank below the head.

We have also carried out the same tests on No. 6 pan head screws having the improved recess but using the known driver in its original form (i.e. not shortened) see FIG. 14 and we found that the results obtained were very much the same as those demonstrated by the FIG. 13 tests (i.e. longer driver life and consistent improved resistance to cam-out) except that in the case of cadmium plated screws (those marked X in FIG. 14) cam-out of the driver took place at lower torque rather than screw failure as in the tests of FIG. 13.

The tests described herein show that a very substantial increase in driver life can be expected from the improved recess and, in addition, there are also advantages appertaining to the tooling (i.e. the punches) which are used to form the improved recess.

In the present commercial version of said known recess, in an attempt to improve resistance to cam-out, the recess is designed to have the driving wall of each groove lying in a plane which slopes at a very slight angle outwardly away from the screw axis and in the direction downwardly away from the mouth of the recess, or, in simple mechanical terms the driving wall is "undercut." The opposed wall of each groove has a similar but inwards angle of taper to put it on a parallel plane. However this has never had any marked effect in improving resistance to cam out, because it is intended to function on the theoretical concept of face-to-face engagement (which we have shown herein to be not the general case in practice). Also this design of recess was difficult to produce, the punches for forming the recesses were difficult to make and were subject to more than the normal amount of wear due to the absence of the normal positive draft angles on the face of the punch which formed the driving walls of the grooves.

With the improved recess, the punch can have the desired positive draft angles on all faces, in accordance with good forging practice and thus much longer tool life can be obtained than with the case abovementioned. Also the larger surface area of the punch nose and the shallower depth of the recess both contribute towards longer working life for the punch.

Towards the end of the normal life of a punch which is producing the improved recess, and due to the normal amount of wear on the punch, there will tend to be less displacement of metal in forming the recess and excess metal will be left in the recess mostly in the inner regions of the recess formed by the nose of the punch (i.e. in the inner regions the recess will be slightly undersize as compared with a recess formed at the beginning of the punch life). However this will not affect the performance of recess produced at the end of the punch life because the abovementioned angular clearance between the improved recess and the known driver is sufficient to accommodate any excess metal in the recess.

The invention also includes within its scope novel driver for use with the improved recess, and one embodiment of such novel driver for use with the recess of FIGS. 1 and 2 is shown in side and end elevation in FIGS. 15 and 16 respectively. The driver has wings 30 and V-section ribs 31 for engaging in the groove and V-shaped valleys respectively in the recess, these being formed on the nose of the driver at the end of a shank 32. Shank 32 may be a short shank as for a bit to be used in a power tool or a longer shank with handle at the end for manual operation. The included angle of the cone (or pyramid) containing surfaces of the outer faces of wings 30 has a value within the range 40° to 45° and in the preferred embodiment is 40°. This novel form of driver which is compatible with the improved recess is preferred for driving self tapping screws and self drilling/tapping screws where it is very desirable to have a good fit in the recess to maintain the driver in actual alignment with the recess. Also some users like to be able to "stick" a screw on the end of the driver when offering a screw in cramped conditions and here also the novel, compatible, matching driver is preferred. Thus although not essential, this novel form of driver is preferred in certain cases.

For this reason the calculation of the preferred and minimum main cone angle of 40° (refer to FIG. 9) has been based on the combination of the improved recess and said novel compatible driver to give the theoretically perfect case. However we have shown, from the tests mentioned herein, that the improved cam out performance of the recess of the invention is still achieved when using the known form of driver (main cone angle of 52°).

Also the invention includes within its scope a novel punch for forming a recess in a screw head, as shown in fragmentary side view in FIG. 17 and in end view of FIG. 18. The punch has a body 40 and cavity 41 to form the desired shape of head with the projecting punch nose having ribs 42 to form the grooves of the recess and V-shaped ribs 43 to form the V-shaped valleys of the recess shown in FIGS. 1 and 2 the included angle of the cone (or pyramid) containing the outer faces of ribs 42 has a value within the range 40° to 45° and in the preferred embodiment has a value of 40°.

I claim:

1. A screw for reducing cam-out of a driver comprising an elongated threaded shank extending along a central longitudinal axis and having a head at one end, said head having an outer face with a cruciform type recess extending inwardly therefrom along said axis and terminating at a bottom wall, said recess including a central cavity having a generally square cross-section from its outer end to its bottom end and which tapers uniformly from a maximum cross-section at said outer face of the head to a minimum cross-section at said bottom wall, said recess further including four grooves radiating from the central cavity at 90° angular spacings symmetrically about said axis and each groove extending outwardly from a side of the generally square cross-section of the central cavity and terminating at an outer wall, the outer wall of each groove tapering downwardly and inwardly from said outer face to said bottom wall, and said outer walls defining a main cone angle of at least 40° and not more than 45°.

2. The screw according to claim 1 in which said generally square central cavity defines V-shaped valleys communicating with the inner ends of said grooves, and the distance between diametrically opposed valleys is substantially less than the distance along the bottom wall of diametrically opposed grooves so that a driver of a size to be cooperatively received by the grooves cannot be accidentally inserted into said valleys.

3. The screw according to claim 1 in combination with a driver having a nose which includes four radial wings, the nose being of a size to be received within said recess for driving engagement with said screw.

4. The combination of claim 3 in which the outer surfaces of the radial wings of said driver are disposed at an angle which is substantially the same as the main cone angle of the screw.

5. The combination of claim 3 in which the outer surfaces of the radial wings of the driver are disposed at a main cone angle of 52°.

* * * * *